United States Patent [19]

Onitsuka

[11] Patent Number: 4,714,869
[45] Date of Patent: Dec. 22, 1987

[54] EXCITATION CONTROL APPARATUS FOR SYNCHRONOUS MACHINE

[75] Inventor: Naganori Onitsuka, Tokyo, Japan

[73] Assignee: Kabushiki Kaisha Toshiba, Kawasaki, Japan

[21] Appl. No.: 882,393

[22] Filed: Jul. 7, 1986

[30] Foreign Application Priority Data

Jul. 10, 1985 [JP] Japan ................................. 60-150115

[51] Int. Cl.$^4$ .............................................. H02P 9/30
[52] U.S. Cl. ........................................ 322/20; 307/84; 322/28
[58] Field of Search ....................... 322/25, 28, 73, 86, 322/20; 307/84, 87, 75, 76

[56] References Cited

U.S. PATENT DOCUMENTS 4,245,182  1/1981  Aotsu et al. ..................... 307/84 X

FOREIGN PATENT DOCUMENTS 0053100  3/1984  Japan ..................................... 322/28
0191497  10/1984  Japan ..................................... 322/28

*Primary Examiner*—R. J. Hickey
*Attorney, Agent, or Firm*—Oblon, Fisher, Spivak, McClelland, & Maier

[57] ABSTRACT

Before a synchronous machine is connected with a line, the set value of a voltage setter is controlled so that the difference between the line voltage and the set value of the voltage setter is decreased to zero, and a field current is then controlled so that the difference between the set value and the output voltage of the synchronous machine is decreased to zero, thereby parallel-connecting the synchronous machine with the line.

4 Claims, 6 Drawing Figures

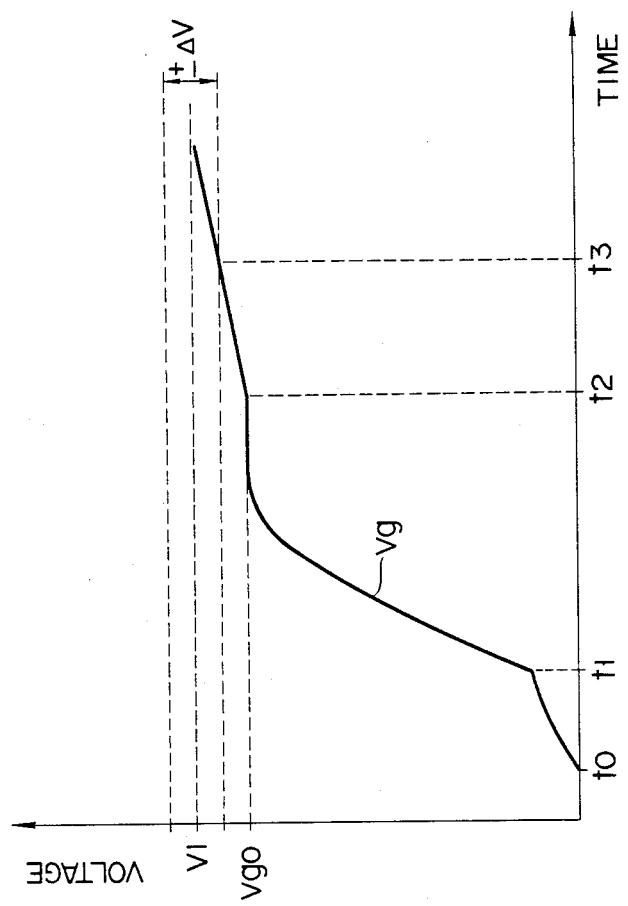
F I G. 2

EXCITATION CONTROL APPARATUS FOR SYNCHRONOUS MACHINE

BACKGROUND OF THE INVENTION

The present invention relates to an excitation control apparatus for a synchronous machine, which is synchronized or parallel-connected with an electric power line within a short period of time.

In general, when a synchronous machine is synchronized with an electric power line, they must be synchronized with each other after differences between respective voltages, frequencies, and phases are minimized to an appropriately small value.

In particular, conventional large synchronous machines require a relatively long period of time to adjust their frequency and phase. However, since they are continuously operated for a long period of time, such a long adjustment time is not regarded as a problem.

However, recently, large machines tend to be frequently driven and stopped in accordance with variations in loads of the electric power line because of the improvement in the speed governing device in the synchronous machine and in order to improve the operation efficiency of the synchronous machine. Therefore, a time required for controlling the voltage is not negligible.

When a synchronous motor is started by low-frequency starting equipment, conditions for a voltage must be quickly satisfied, and as soon as conditions for speeds and phases are satisfied, they must be synchronized. Therefore, a demand has arisen for decreasing the time required for controlling the voltage of the synchronous machine to be as short as possible.

FIG. 1 is a block diagram of a synchronous machine using a conventional thyristor exciter.

Field winding 2 of synchronous machine 1 is connected to thyristor exciter 4 through field circuit breaker 3. The output from synchronous machine 1 is supplied, as an AC power source, to thyristor exciter 4 through field transformer 5. Initial excitation power source 7 is connected in parallel with thyristor exciter 4 through initial excitation switch 6.

Automatic voltage adjusting apparatus 8 comprises voltage detector 10, which detects the output voltage from synchronous machine 1 through first voltage transformer 9. The detection value of detector 10 and the set value of voltage setter 11 are input to subtracter 12 to obtain a difference therebetween. The difference is then supplied to gate pulse generator 13. Gate pulse generator 13 generates pulses which are phase-controlled in accordance with the difference, and supplies them to thyristor exciter 4 through pulse transformer 14, thereby controlling the output voltage from synchronous machine 1 to correspond with the set value of voltage setter 11.

Synchronous machine 1 is synchronized with electric power line 16 through synchronous circuit breaker 15. Synchronism indicator 18 and voltage control apparatus 19 are installed to have as their inputs the secondary sides of first voltage transformer 9 and second voltage transformer 17 connected to line 16.

Voltage control apparatus 19 detects the voltage from synchronous machine 1 through first voltage transformer 9 with synchronous machine voltage detector 20, and detects the voltage from line 16 through second voltage transformer 17 with line voltage detector 21. These detectors supply their detection values to subtracter 22 to detect a difference therebetween. Thereafter, voltage controller 23 controls the set value of voltage setter 11 of apparatus 8 so that the difference is decreased to zero.

FIG. 2 is a graph showing the relationship between a change in the voltage of synchronous machine 1 over time and the voltage of line 16 from when a voltage is generated from a non-excited state until machine 1 is synchronized with line 16 in the case wherein machine 1 is a power generator.

Note that the abscissa indicates time, and the ordinate indicates voltage Vl of line 16 or voltage Vg of machine 1. Reference symbol Vg0 denotes the voltage of machine 1 corresponding to an initial set value of voltage setter 11.

When circuit breaker 3 and switch 6 are closed at time t0, the voltage of DC power source 7 is applied to field winding 2, and a field current gradually increases in accordance with the time constant of winding 2.

At time t1, when output voltage Vg of machine 1 is increased to a value that causes gate pulse generator 13 of apparatus 8 to generate gate pulses, thyristor exciter 4 is controlled by apparatus 8. The current from exciter 4 is supplied to winding 2 through transformer 5 using the output from machine 1 as a power source.

When exciter 4 is operated, switch 6 is opened, and output voltage Vg of machine 1 immediately increases upon operation of apparatus 8. At time t2, voltage Vg reaches voltage Vg0 corresponding to the set value of setter 11.

When the voltage of machine 1 is stabilized, voltage control then starts.

When the voltage condition, detected by indicator 18 for indicating the difference between voltages Vg of machine 1 and voltage Vl of line 16, is smaller than constant value V, circuit breaker 15 is closed to synchronize machine 1 with line 16.

When the difference is smaller than value ΔV and the voltage of machine 1 is stabilized at voltage Vg to correspond to the initial set value of setter 11, the synchronous voltage condition is satisfied.

However, as shown in FIG. 2, voltage Vl of line 16 is not always constant, and is often larger than constant value ΔV. In this case, apparatus 19 is operated so that voltage setter 11 is driven to decrease the difference between the detection values from detectors 20 and 21. Thus, voltage Vg of machine 11 is approximated to voltage Vl of line 16, and the difference becomes smaller than constant value ΔV at time t3. Therefore, when difference ΔV between voltage Vg of machine 1 and voltage Vl of line 16 is small, a time interval between times t2 and t3 is relatively short. However, when difference ΔV is large, this time interval is long.

SUMMARY OF THE INVENTION

It is an object of the present invention to provide an excitation control apparatus for a synchronous machine, which requires no time period for voltage control when the synchronous machine is synchronized with an electric power line.

It is another object of the present invention to provide an excitation control apparatus for a synchronous machine, which can control the set voltage of a voltage setter of an automatic voltage control apparatus to substantially coincide with a line voltage before the synchronous machine generates a voltage.

According to the present invention, an excitation control apparatus for a synchronous machine can be provided wherein, since the set voltage of the voltage setter of the automatic voltage control apparatus can coincide with the line voltage before the synchronous machine generates a voltage, no time is required for voltage control when the synchronous machine is synchronized with the electric power line, and the synchronous machine can be efficiently synchronized with the electric power line.

BRIEF DESCRIPTION OF THE DRAWINGS

FIG. 2 is a timing chart for explaining the operation of the apparatus shown in FIG. 1;

DESCRIPTION OF THE PREFERRED EMBODIMENTS

Figure 3:
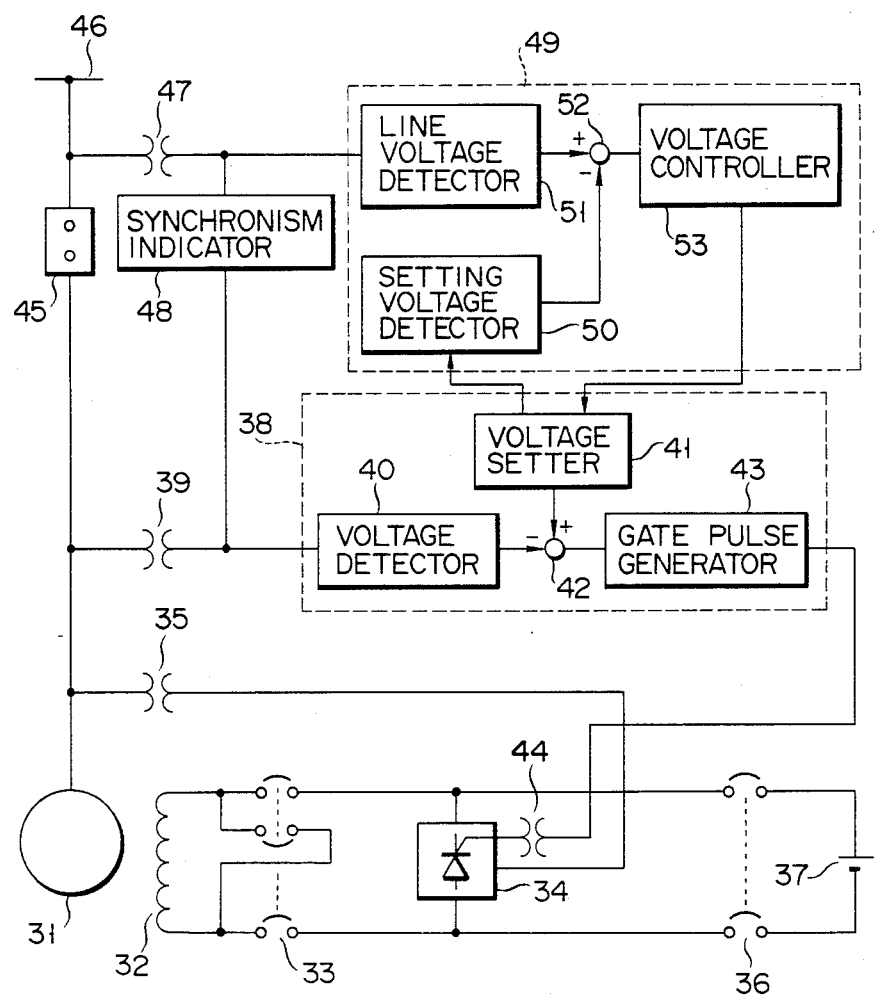
FIG. 3 is a block diagram of an apparatus according to an embodiment of the present invention.

An embodiment of the present invention will now be described with reference to the block diagram of an excitation control apparatus using a thyristor exciter, as shown in FIG. 3.

Field winding 32 of synchronous machine 31 is connected to thyristor exciter 34 through field circuit breaker 33. The output from machine 31 is supplied, as an AC power source, to thyristor exciter 34 through excitation transformer 35. Thyristor exciter 34 is connected in parallel with initial excitation power source 37 through initial excitation switch 36.

Automatic voltage control apparatus 38 comprises automatic voltage detector 40 which detects the output voltage supplied from machine 31 through first voltage transformer 39. The detection value of detector 40 and a set value of voltage setter 41 are input to subtracter 42 to obtain a difference therebetween. The difference is then supplied to gate pulse generator 43. Gate pulse generator 43 generates pulses which are phase-controlled in accordance with the difference, and supplies them to thyristor exciter 34 through pulse transformer 44, thereby controlling the output voltage of machine 31 to correspond with the set value of voltage setter 41.

Synchronous machine 31 is synchronized with electric power line 46 through synchronous circuit breaker 45.

Voltage control apparatus 49 is installed to have as its inputs the secondary sides of first voltage transformer 39 and second voltage transformer 47 connected to line 46.

Voltage control apparatus 49 detects the set voltage of voltage setter 41 with set voltage detector 50, and detects the voltage of line 46 through transformer 47 with line voltage detector 51.

These detectors supply their detection values to subtracter 52 to detect the difference therebetween. Thereafter, voltage setter control apparatus 53 controls the set value of setter 41 of apparatus 38 so that the difference is decreased to zero.

Figure 1:
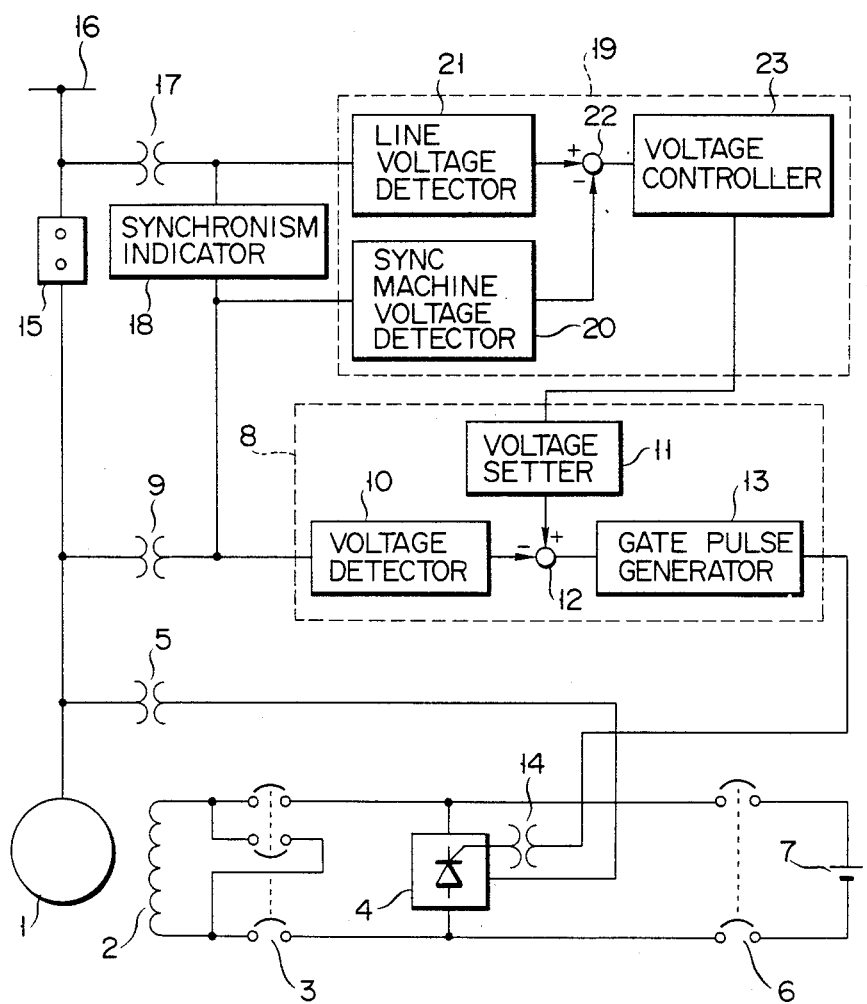
FIG. 1 is a block diagram of a conventional excitation control apparatus for a synchronous machine.

In the conventional excitation control apparatus shown in FIG. 1, the output voltage of machine 1 is detected by synchronous machine voltage detector 20. However, exciter 34 of the present invention comprises set voltage detector 50 for detecting the set voltage of setter 41.

Figure 4:
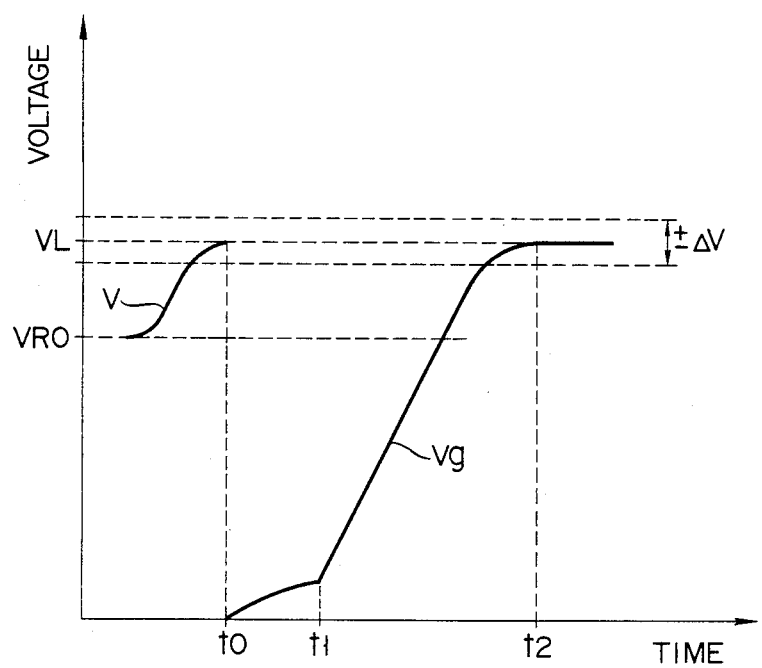
FIG. 4 is a timing chart for explaining the operation of the apparatus shown in FIG. 3.

FIG. 4 is a graph showing the relationship between a change in the voltage over time of synchronous machine 31 and the voltage of line 46 from when a voltage is generated from a non-excited state until machine 31 is synchronized with line 46 in the case wherein machine 31 is a power generator.

Note that the abscissa indicates time, and the ordinate indicates voltage Vl of line 46 or voltage Vg of machine 31. Reference symbol Vr, a voltage obtained by converting the voltage of voltage setter 41 to the output voltage of machine 31; and Vr0, an initial value of voltage Vr.

In this embodiment, at time t0, field circuit breaker 33 is closed and voltage control apparatus 49 is operated before machine 31 generates a voltage. More specifically, if initial set value Vr0 of voltage setter 41 is greatly different from the voltage of line 46, set value Vr of setter 41 becomes substantially equal to voltage Vl of line 46 before breaker 33 is turned on, and the difference therebetween falls within constant value $\Delta V$.

At time t1, breaker 33 and switch 36 are closed and, at time t2, voltage Vg of machine 31 is stabilized at the voltage equal to value Vr of setter 41 set at time t0, in the same manner as in the apparatus shown in FIG. 1.

Meanwhile, since the difference between set value Vr of setter 41 and line voltage Vl has already become smaller than constant value $\Delta V$ at time t0, the difference between voltage Vg of machine 31 stabilized at t2 and line voltage Vl is smaller than value $\Delta V$ and, therefore, an indication condition of synchronism indicator 48 can be satisfied.

Therefore, voltage control for synchronizing the output from machine 31 with line 46 after machine 31 generates a voltage can be omitted, and machine 31 can be efficiently synchronized with line 46.

Figure 5:
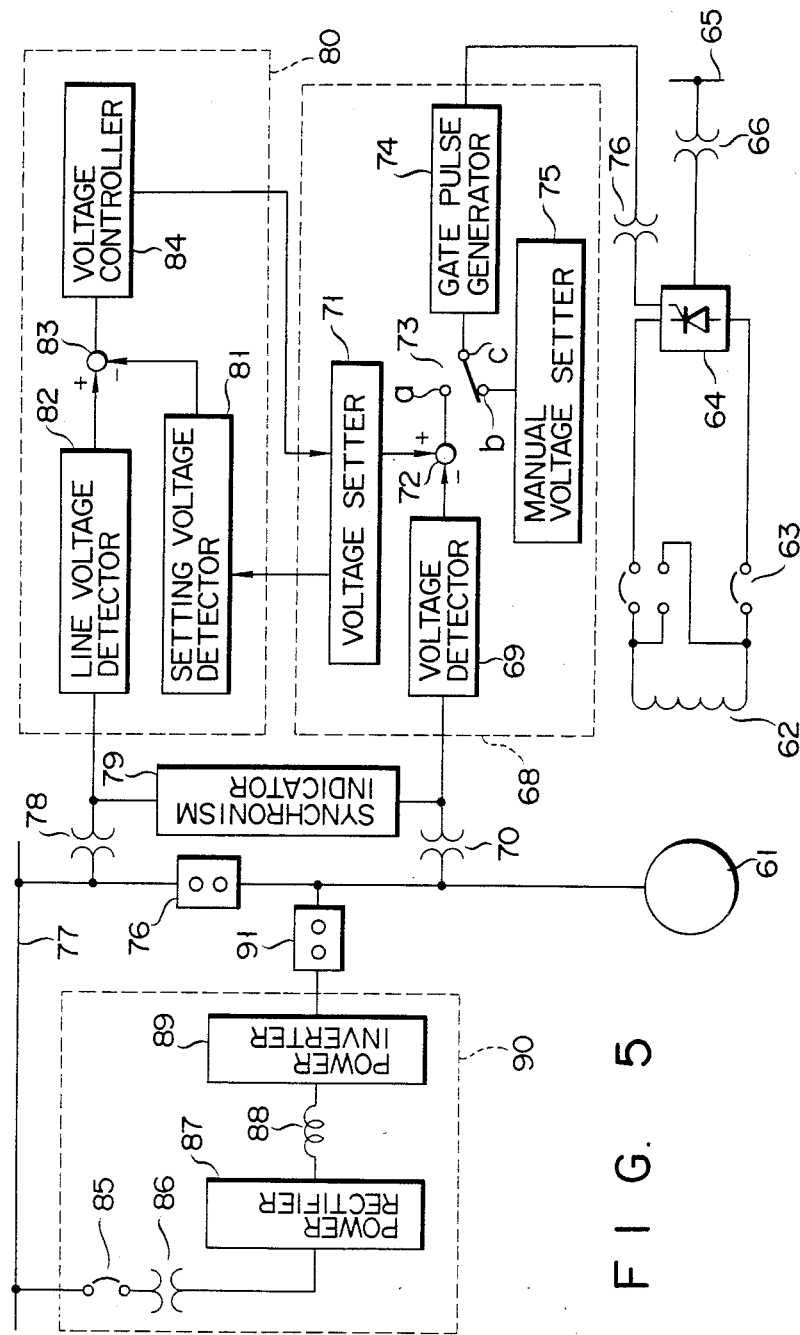
FIG. 5 is a block diagram of an apparatus according to another embodiment of the present invention.

In the above description, the case has been exemplified wherein the present invention is applied to excitation control of a power generator. Another embodiment of the present invention will be exemplified with reference to the block diagram shown in FIG. 5, wherein the present invention is applied to a synchronous motor which is started by low-frequency synchronization.

In this embodiment, a static starter is used as a starting device. The rotational speed of the synchronous motor is increased to a rated value by a reduced voltage and, thereafter, the voltage thereof is immediately increased to the rated voltage.

Field widing 62 of synchronous machine 61 is connected to thyristor exciter 64 through field circuit breaker 63. An AC voltage is supplied from AC power source 65 to thyristor exciter 64 through excitation transformer 66 to convert it into a DC voltage, and the current is then supplied to field winding 62 of machine 61 through breaker 63.

In automatic voltage control apparatus 68, the output voltage from machine 61 is input to automatic voltage detector 69 through first voltage transformer 70 to detect it.

The detection value of detector 69 and a set value of voltage setter 71 are input to subtracter 72 to obtain the difference therebetween. The difference is then supplied to gate pulse generator 74 through switching circuit 73.

One stationary contact b of switching circuit 73 is connected to the output of subtracter 72, the other stationary contact b is connected to the output of manual voltage setter 75, and movable contact c is connected to the input of gate pulse generator 74. Gate pulse generator 74 generates pulses which are phase-controlled in accordance with the difference supplied from subtracter 72, and supplies them to thyristor exciter 64 through pulse transformer 76, thereby controlling the current of winding 62 of machine 61 to correspond with the set value of voltage setter 71.

Synchronous machine 61 is also connected to electric power line 77 through synchronous circuit breaker 76.

Synchronism indicator 79 and voltage control apparatus 80 are installed to have as their inputs the secondary sides of first voltage transformer 70 and second voltage transformer 78 connected to line 77.

Voltage control circuit 80 detects the set voltage of voltage setter 71 with set voltage detector 81, and detects the voltage of line 77, input through transformer 78, with line voltage detector 82.

These detectors supply their detection values to subtracter 83 to detect the difference therebetween, and voltage setter controller 84 then controls the set value of setter 71 of apparatus 68 so that the difference is decreased to zero.

In addition, static starter 90 is provided wherein electric power from line 77 is supplied to power rectifier 87 through power source switch 85 and power source transformer 86 to obtain a DC voltage, and is then converted to an AC voltage by power inverter 89 through DC reactor 88.

The output from static starter 90 is supplied to the terminal of machine 61 through low-frequency synchronous circuit breaker 91.

Figure 6:
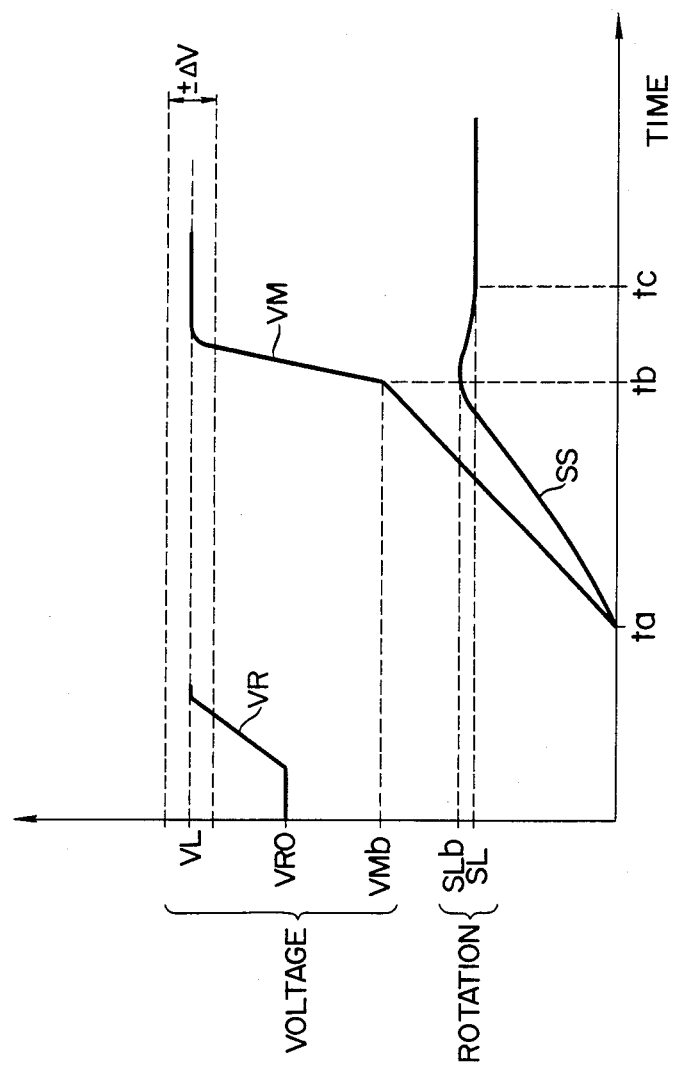
FIG. 6 is a timing chart for explaining the operation of the apparatus shown in FIG. 5.

FIG. 6 is a graph showing changes terminal voltage and rotational speed of machine 61 over time. In FIG. 6, reference symbol Vm denotes a terminal voltage of machine 61; Ss, a frequency of machine 61; and Sl, a frequency of line 77.

As can be seen from FIG. 6, difference ΔV between set voltage Vr of setter 71 and line voltage Vl becomes smaller than a constant value before machine 61 is excited at time ta, in the same manner as in the embodiment shown in FIG. 3.

At time ta, machine 61 receives a field current from thyristor exciter 64, and is excited by the output power from static starter 90. At this time, switching circuit 73 of apparatus 68 selects its contact b so that gate pulse generator 74 performs a control operation in accordance with the set value of manual voltage setter 75 (i.e., so-called constant excitation control).

At the same time, static starter 90 is also started, and gradually increases output frequency Ss.

Upon increase of output frequency Ss, the voltage supplied to the terminal of machine 61 from static starter 90 also increases, substantially in proportion to frequency Ss. Frequency Ss increases up to value Slb slightly higher than frequency Sl of line 77.

At this time, since the low-frequency excitation method adopts a reduced voltage technique in terms of the economy of starter 90, terminal voltage Vm is at value Vmb considerably lower than line voltage Vl.

When frequency Ss of machine 61 has reached constant frequency Slb of line 77 at time tb, starter 90 stops operating, and low-frequency synchronous circuit breaker 91 is opened. Next, machine 61 is rotated by its inertia to be operated as a power generator, and a voltage appears at the terminal thereof.

Therefore, after time tb, the frequency of machine 61 begins to fall toward frequency Sl of line 77.

Switching circuit 73 then selects its contact a, and apparatus 68 controls the field current of machine 61 using thyristor exciter 64 so that terminal voltage Vm of machine 61 becomes equal to set value Vr of voltage setter 71.

Since set value Vr of voltage setter 71 is already substantially equal to voltage Vl of line 77, terminal voltage Vm of machine 61 immediately increases and is stabilized at a value substantially equal to the voltage of line 77, thus satisfying the voltage condition of synchronism indicator 79.

When frequency Ss of machine 61 gradually decreases to be substantially equal to frequency Sl of line 77 and the frequency and phase conditions of indicator 79 are satisfied, circuit breaker 76 is closed, and machine 61 is driven by electric power supplied from line 77.

In this case, since starter 90 is stopped and machine 61 is synchronized with line 77 while its rotational speed decreases, the synchronism conditions of indicator 79 must be satisfied upon single operation, and the conditions for the voltage can be satisfied in advance.

In this way, when the set value of voltage setter 71 of apparatus 68 is controlled to be equal to the voltage of line 77 before machine 61 is excited, excitation and synchronization by the reduced voltage are achieved.

What is claimed is:

1. An excitation control apparatus for controlling an excitation of a synchronous machine comprising:
    voltage setting means for previously generating an output voltage equal to a rated output voltage of a synchronous machine;
    voltage control means for controlling the output voltage of said voltage setting means so that the output voltage thereof becomes equal to a voltage of a line at a time when said synchronous machine is started;
    first voltage detecting means for detecting an output voltage of said synchronous machine; and
    voltage adjusting means for automatically controlling an excitation current of the synchronous machine after the synchronous machine has been started so that the output voltage of the synchronous machine becomes equal to the ouput voltage of the line.

2. An apparatus according to claim 4, wherein said voltage control means comprises:
    second voltage detecting means for detecting the voltage set by the voltage setting means;
    third voltage detecting means for detecting the voltage of the line;
    difference detecting means for detecting the difference between the voltage detected by the second voltage detecting means and the voltage detected by the third voltage detecting means; and
    a voltage controller for controlling the voltage set by said voltage setting means so that an output voltage of said voltage setting means becomes equal to the voltage of the line.

3. An apparatus according to claim 1, wherein said voltage adjusting means comprises:
    difference detecting means for detecting the differenace between the voltage detected by the output detecting means and the voltage set by the voltage setting means; and control means for controlling an excitation current of the synchronous machine so that an output voltage of said synchronous machine becomes equal to the output voltage of said voltage setting means.

4. An excitation control apparatus for controlling an excitation of a synchronous machine comprising:

voltage setting means for previously generating a set voltage equal to a rated output voltage of a synchronous machine;

first voltage detecting means connected to said voltage setting means for detecting the set voltage of said voltage setting means;

second voltage detecting means for detecting a line voltage;

first difference detecting means for detecting a difference between the set voltage detected by the first voltage detecting means and the line voltage detected by the second voltage detecting means;

voltage control means for controlling the set of said voltage setting means according to said difference of said second difference detecting means so that a set voltage thereof becomes equal to the line voltage when said synchronous machine is started;

third voltage detecting means for detecting an output voltage of said synchronous machine;

second difference detecting means for detecting a difference between a set output voltage of said voltage setting means and an output voltage of said third voltage detecting means; and means for controlling an excitation current of said synchronous machine according to said difference detected by said second difference detecting means after the output voltage of said voltage setting means is not equal to the line voltage, so that the output voltage of the synchronous machine becomes equal to the output voltage of the voltage setting means.

* * * * *